United States Patent [19]

Ohnuki et al.

[11] Patent Number: 4,974,003
[45] Date of Patent: Nov. 27, 1990

[54] CAMERA HAVING AN AUTOFOCUS DEVICE

[75] Inventors: Ichiro Ohnuki; Masayoshi Kiuchi; Akira Akashi; Terutake Kadohara; Masaki Higashihara, all of Kanagawa, Japan

[73] Assignee: Canon Kabushiki Kaisha, Tokyo, Japan

[21] Appl. No.: 375,875

[22] Filed: Jul. 6, 1989

[30] Foreign Application Priority Data

Jul. 19, 1988 [JP] Japan .................................. 63-178050

[51] Int. Cl.[5] .............................................. G03B 13/36
[52] U.S. Cl. .................................... 354/400; 354/402; 354/173.1
[58] Field of Search ............... 354/400, 402, 403, 408, 354/173.1

[56] References Cited

U.S. PATENT DOCUMENTS

| | | | |
|---|---|---|---|
| 4,435,058 | 3/1984 | Yoshida et al. | 354/173.1 |
| 4,464,037 | 8/1984 | Terui et al. | 354/400 |
| 4,688,914 | 8/1987 | Sakai et al. | 354/402 |
| 4,786,932 | 11/1988 | Akashi | 354/402 |

Primary Examiner—Russell E. Adams
Attorney, Agent, or Firm—Fitzpatrick, Cella, Harper & Scinto

[57] ABSTRACT

In a camera having an autofocus device, when performing a continuous shooting, an autofocus operation by the autofocus device is repeatedly performed during a time from the termination of the shooting operation to the completion of a preparation for the next shooting operation, and if the performance of the autofocus operation has been at least once completed before the completion of the preparation for the next shooting operation, the completion of the aforesaid preparation for the next shooting operation is, even though the autofocus operation is in progress, immediately followed by the start of the next shooting operation, while if the autofocus operation has not been at least once completed before the completion of the aforesaid preparation for the next shooting operation, the next shooting operation is started depending on the completion of the autofocus operation.

7 Claims, 7 Drawing Sheets

CAMERA HAVING AN AUTOFOCUS DEVICE

BACKGROUND OF THE INVENTION

1. Field of the Invention

This invention relates to autofocus cameras capable of alternating focus adjusting operations with releasing operations in continuous succession.

2. Description of the Related Art:

In the case of, while carrying out the focus adjusting (hereinafter described as AF) operation, continuously shooting a series of frames at a high speed, it is normal that the frame speed and the AF accuracy do not coincide. That is, the AF operation necessarily takes more than a certain time to perform. If this is perfectly completed for every one frame, the time necessary to shoot one frame gets longer. Conversely when priority is put on the frame speed, transition to the next shot occurs with the AF operation unfinished. Thus, the establishment of a sharp focus is not assured.

So, in the prior art, as shown in, for example, Japanese Laid-Open Patent Application No. Sho 57-146242, division into an AF priority mode and a frame speed priority mode is made to allow the photographer to take his choice.

But, this has the following drawbacks:

(i) To make a preferential choice of one of the sharp focus and the frame speed is to sacrifice the other. Nevertheless, the photographers generally desire a result that the degrees of priority of both are moderately well balanced. So, if, as has been described above, there are separate modes instead, they get lethargic in judging which is better to choose.

(ii) In the AF priority mode, the AF result is locked after the sharp focus is reached. Also, the condition of film transport and mechanical charge is monitored. When both have been completed, a releasing operation on the next frame is started. If, despite the completion of the AF operation in a short time, the film transport and mechanical charge is even still going on, it will take a considerably long time from after the AF is locked in sharp focus to the next shot. In other words, despite the AF priority mode, for a fast moving object, its image will probably be out of focus.

(iii) To another object which is moving at a faster speed, a problem arises that even if the AF operation alone is repeated, the camera cannot get out of the defocus state at all times, because there is a follow-up delay due to the time necessary to the AF operation. Since, in the AF priority mode, the shutter cannot be released until the sharp focus is reached, the shot cannot be taken indefinitely. In such a case, because shooting in the AF priority mode is impossible to do, provision must be made of, for example, a capability of automatic transition to a mode that, although the in-focus state is not perfect, the shutter can be released. Otherwise, a good shutter chance would be lost.

SUMMARY OF THE INVENTION

One aspect of the application is to provide a camera having an autofocus device in which when continuous shooting, if, after the termination of an exposure and before the completion of a preparation for the next exposure, the autofocus operation is at least once completed by the autofocus device, it is made to occur that even during the time when the autofocus operation is in progress, the termination of the exposure preparation is immediately followed by the initiation of the next shooting operation, while, if, before the preparation for the next exposure is completed, the autofocus operation is not at least once completed, the next shooting operation is initiated, depending on the completion of the autofocus operation.

Another object of the invention will become apparent from the following description of embodiments thereof by using the drawings.

DETAILED DESCRIPTION OF THE PREFERRED EMBODIMENTS

Figure 1:
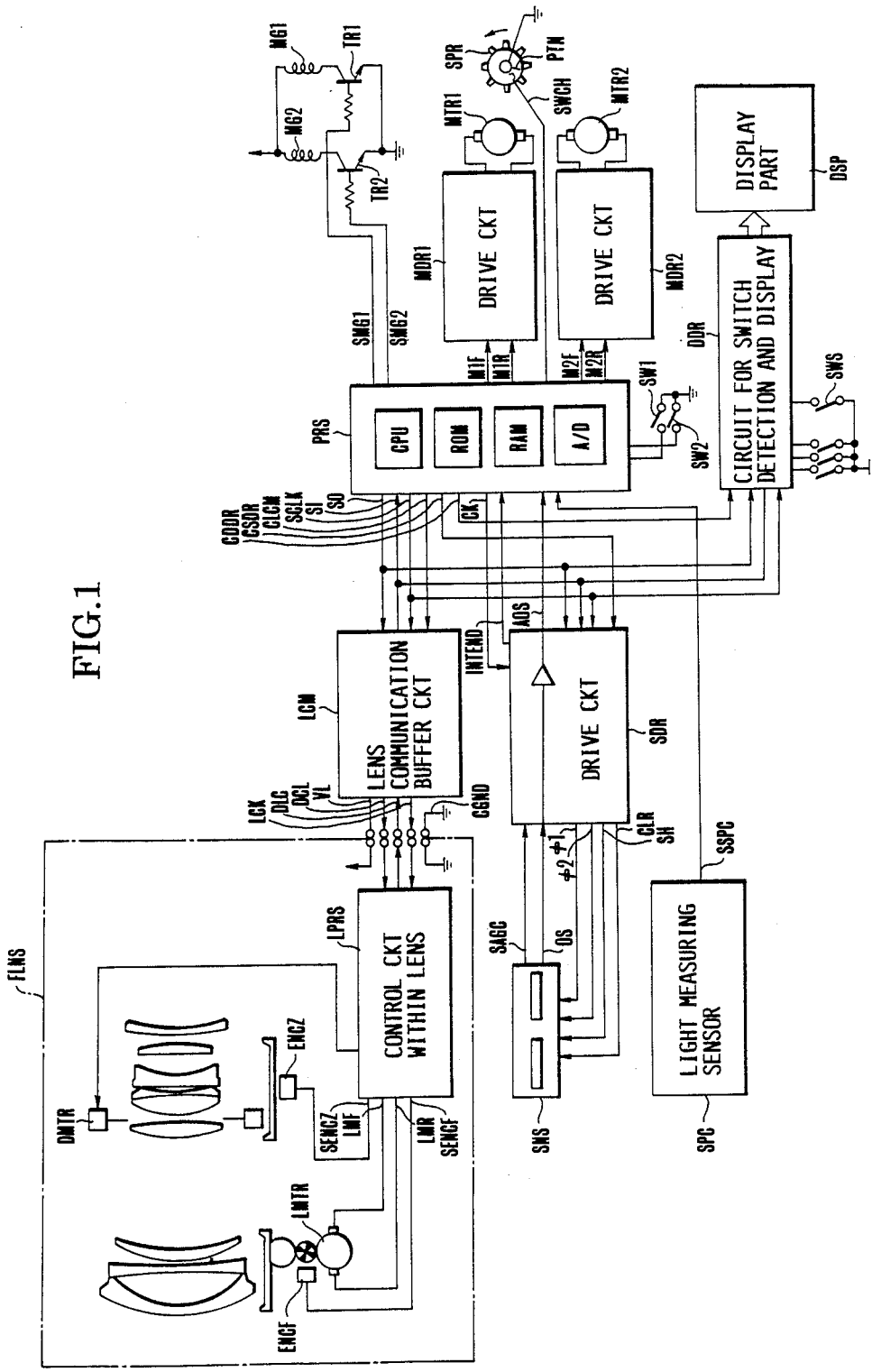
FIG. 1 is an electrical circuit diagram of an embodiment of a camera having an autofocus device according to the invention.

FIG. 1 is an electrical circuit diagram that shows one embodiment of the invention.

In the same figure, the camera has a control circuit PRS in the form of, for example, a one-chip microcomputer having incorporated therein a central processing unit (CPU), a ROM, a RAM and an A/D converting part. According to a sequence program for the camera stored in the aforesaid ROM, the automatic focus control function, the automatic focus detecting function, the winding of film, and other operations of the camera are performed in sequence For these purposes, using signals SO, SI and SCLK for synchronously coordinated communication and communication selecting signals CLCM. CSDR and CDDR, the control circuit PRS communicates with peripheral circuits within the camera body and with the lens to control the operations of the individual circuits and the lens.

SO is a data signal output from the control circuit PRS; SI is a data signal to be inputted into the control circuit PRS; SCLK is a synchronous clock for the signals SO and SI.

A lens communication buffer circuit LCM, when the camera is in operation, supplies electric power to an electrical power source terminal for the lens, or when the selecting signal CLCM output from the control circuit PRS is of high potential level (hereinafter described as "H"), functions as the communication buffer between the camera and the lens.

When the control circuit PRS changes the selecting signal CLCM to "H" and sends predetermined data out as the signal SO in synchronism with the clock SCLK, the lens communication buffer circuit LCM receptive of the signals SCLK and SO produces the respective buffer signals LCK and DCL which are supplied to the lens through interconnections between the camera and the lens. At the same time, it receives a signal DLC from the lens and produces a buffer signal SI which is supplied to the control circuit PRS. From the signal SI synchronized with the clock SCLK, the control circuit PRS reads the data of the lens.

A signal CK is used for generating clocks $\phi 1$ and $\phi 2$ for CCD drive. A signal INTEND informs the control circuit PRS of the fact that the CCD storage has ended.

A sensor device SNS produces output signals 0S representing an image in time-serial form synchronized with the clocks $\phi 1$ and $\phi 2$, which after having been amplified by an amplifier in a drive circuit SDR are supplied as signals AOS to the control circuit PRS. Receiving these signals AOS from its analog input terminal, the control circuit PRS converts them into digital form by its internal A/D converting part in synchronism with the clock CK, and then stores them in predetermined addresses successively.

Another output signal SAGC the sensor device SNS produces, which originates from a sensor for Auto Gain Control (AGC) within the sensor device SNS, is supplied to the drive circuit SDR in order that it is used to control the storage of the sensor device SNS.

A light measuring sensor SPC for exposure control is positioned to receive light coming from an object to be photographed and entering through the photographic lens. Its output SSPC is supplied to an analog input terminal of the control circuit PRS and, after having been converted into digital form, is used according to a predetermined program in automatic exposure control (AE).

A circuit DDR for switch detection and display, when a signal CDDR is "H", is selected to be controlled by the control circuit PRS by using the signals SO, SI and SCLK. That is, based on the data being sent from the control circuit PRS, the circuit DDR changes the display of a display part DSP of the camera, and informs the control circuit PRS of the on-off states of various operating members of the camera by communication.

Switches SW1 and SW2 are operatively connected to a release button (not shown) By the pushing pressure to a first stage of the release button, the switch SW1 is turned on. By the subsequent pushing pressure to a second stage, the switch SW2 is turned on. The control circuit PRS, as will be described later, when the switch SW1 turns on, performs the light measuring and AF operations, and takes the turning on of the switch SW2 as a trigger to perform the exposure control and winding of the film.

An electric motor MTR1 when rotating in one direction carries out shutter charge and film transport. In more detail, the driving torque from the output shaft of the motor MTR1 is transmitted through a speed reduction gear train to rotate a rotary cam for shutter charge, a spool (not shown) for film take-up and a sprocket SPR. The sprocket SPR in engagement with the perforations of the film is arranged to rotate one revolution each time the film has been advanced by one frame and there is provided a pattern PTN which rotates when the sprocket SPR rotates As the one-frame transport of the film is completed, when the pattern PTN comes in the position of a switch SWCH comprised of a brush, this switch SWCH comes into a ground level, being judged to be on. Thus, it is confirmed that the shutter charging and film transporting operation has been completed. Then, the current supply to the motor MTR1 stops. Though the charging and transporting operation ends, it is at this time that the brush of the switch SWCH is left riding on the pattern PTN. Therefore, the on-state of the switch SWCH continues. Incidentally, the above-described shutter charge mechanism and the mechanism of the spool and the sprocket are publicly known and has no relation to the essence of the invention. So, the detailed explanation of their other features are omitted.

An electric motor MTR2 for up-down control of a mirror is so arranged that when rotating in the normal direction, the mirror is moved upward, and when in the reverse direction, it is moved downward. Concerning this too, a more detailed explanation is omitted.

The aforesaid motors MTR1 and MTR2 are controlled by respective drive circuits MDR1 and MDR2. Signals M1R, M1F, M2R and M2F inputted from the control circuit PRS to the motor drive circuits MDR1 and MDR2 are the signals for motor control.

Magnets MG1 and MG2 are supplied with electric current by amplifier transistors TR1 and TR2 in response to signals SMG1 and SMG2 respectively so that the leading and trailing curtains of a shutter start to run. Thus, the control circuit PRS performs the shutter control.

Incidentally, the circuit DDR for switch detection and display, the motor drive circuits MDR1 and MDR2 and the shutter control mechanism are publicly known by the prior art. So, a more detailed explanation is omitted.

A signal DCL which is inputted to a control circuit LPRS within the lens in synchronism with the signal LCK is data of a command from the camera to the lens. The lens operation for the command is previously determined.

The control circuit LPRS analyzes the command according to a prescribed procedure so that the focus is adjusted and the operation of the diaphragm is controlled, and produces an output signal DLC representing various conditions of action of the lens (how long the focus adjusting optical system has moved, what number of stops the diaphragm has been closed, etc.) and the values of parameters (the F-number at full open aperture, the focal length, the coefficient of the focusing movement versus the defocus amount, etc.).

In the FIG. 1 embodiment, there is shown an example of the zoom lens. When the command of focus adjustment is sent from the camera, a motor LMTR for AF is driven according to the simultaneously sent drive amount and direction by signals LMF and LMR so that the optical system is moved axially to perform an AF operation. The amount of movement of the optical system is monitored by an encoder ENCF in the form of a pulse signal SENCF, which is then counted by a counter in the control circuit LPRS. At a time when the predetermined movement has been completed, the control circuit LPRS itself changes the signals LMF and LMR to "L", braking the motor LMTR for AF.

For this reason, after the command for the AF operation has once been sent out from the camera, the control circuit PRS in the camera has no need to participate in driving the lens at all. Also, an arrangement is made such that as necessity arises, the content of the aforesaid counter can be sent out to the camera.

In event that a command for aperture control has been sent out from the camera, the diaphragm is moved a number of stops about which the information is simultaneously sent. As the diaphragm drive, use is made of a publicly known stepping motor DMTR. Incidentally, because the stepping motor DMTR is openly controlled, no encoder for monitoring its operation is necessary to use.

An encoder ENCZ is associated with the zoom section of the optical system. On receipt of a signal SENCZ from the encoder ENCZ, the control circuit LPRS detects the zoom position. A parameter of the lens in each zoom position is stored in the control circuit LPRS so that when there is a request from the control circuit PRS of the camera side, the corresponding parameter to the present zoom position is sent out to the camera.

Figure 2A:
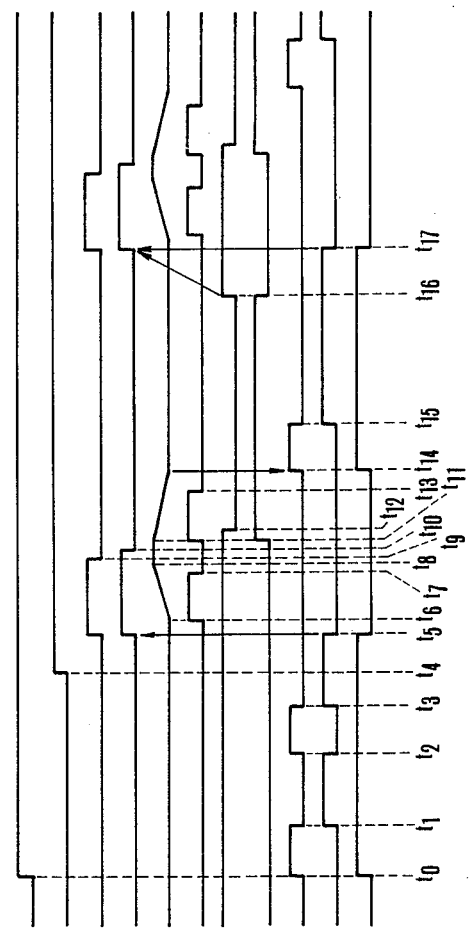
FIGS. 2(a) and 2(b) charts illustrating a manner in which the camera shown in FIG. 1 operates.
Figure 2B:
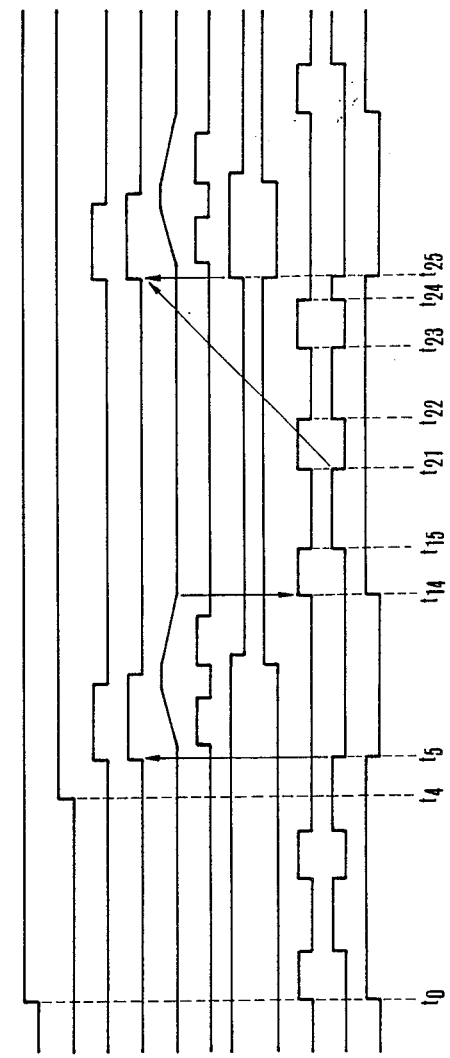

In FIGS. 2(a) and 2(b), there are shown timing charts in the present embodiment.

Each element (SW1 through the timer interrupt) in these figures corresponds to each element of FIG. 1 as follows:

"SW1" and "SW2" represent the aforesaid switches; "MG1" and "MG2" the aforesaid shutter magnets; "Mirror" the quick return mirror in the single-lens reflex camera, which is controlled by the rotation of the aforesaid motor MTR2. "Diaphragm" is controlled by the driving of the aforesaid stepping motor DMTR. "SWCH" is a switch which turns on at the termination of the shutter charge and film one-frame transport. The state of this switch SWCH is detected by a detecting operation by an interrupt timer to be described later. "Charge and Transport" indicates that the mechanical charge of the shutter and the transport of the film are in progress under the control by the rotation of the motor MTR1. "Focus Detection" indicates the storage of an image on the sensor device SNS and the computation of the defocus quantity. "Lens Drive" indicates the control of driving of the lens in accordance with the defocus quantity obtained by the focus detection. "Timer Interrupt" indicates a function to be described later, which operates during the focus detection and lens driving.

Incidentally, the operation on each line of the chart starts at the rising edge and terminates at the falling edge.

In FIG. 2(a), there is shown the timing chart for a case where the charging and transporting operation has ended earlier than the AF operation (focus detection + drive). In the following, explanation is made in pursuit to the order.

At first, at a time $t_0$, the switch SW1 turns on to initiate a focus detecting operation. At a time $t_1$, the focus detecting operation terminates, and immediately a driving operation of the lens is initiated. At a time $t_2$, the lens driving operation ends. Then, the focus detecting and lens driving (AF) operation repeats itself again.

Assuming here that at an arbitrary time $t_4$, a release signal, i.e., an interrupt of the switch SW2, occurs, then the turning on of the switch SW2 is detected by the timer interrupt to be described later. But, the operation does not immediately proceed to the release, so that an AF operation which is performed when the switch SW2 turns on is permitted to continue until it completes itself.

At a time $t_5$, the AF operation ends and a release operation is started. At first, the magnets MG1 and MG2 are supplied with electric current. The shutter used herein is of the type that the armatures of the magnets when in the attracted state prohibit the shutter curtains from running, and when released from the attraction, i.e., when the current supply is cut off, render the shutter curtains possible to run. And, when the camera has been charged, i.e., all of the shutter charging, the mirror-down and the film transport, which constitute a release preparing operation, have been completed, the armatures are mechanically held in the attracted position. Prior to the release operation, they are then electrically attracted by the current supply. Then, in response to a step of the release process, for example, the mirror-up operation, the mechanical attracting mechanism is released. Since, after this, the armatures are attracted only electrically, if the current supply is cut off after the mirror has been moved upward, the shutter curtains runs.

Because the shutter mechanism has the above structure (this is publicly known), it is at the start of the release operation that the magnets MG1 and MG2 are supplied with current. If the shutter is of another type which releases the shutter curtains from the latching connection when the armatures are attracted, such a preliminary attraction is unnecessary.

Now, from the above-described reason, at the time $t_5$ called the release operation permission time, the current supply to the magnets MG1 and MG2 is started. In a very short time, i.e., at a time $t_6$, the mirror-up operation and the stopping-down operation start. Then, at a time $t_7$, the stopping-down operation is completed. At a time $t_8$, the mirror-up operation is completed. Then, at a time $t_9$, the current supply to the magnet MG1 is cut off, causing the leading curtain of the shutter starts to run. In a predetermined time, i.e., at a time $t_{10}$, the current supply to the magnet MG2 is cut off, causing the trailing curtain of the shutter to run. Thus, the exposure to the film terminates.

Then, at a time $t_{11}$, a mirror-down operation, a fully opening operation of the diaphragm, and a charging and transporting operation start. Up to this time, the switch SWCH has been in the "on" state. But, soon after the sprocket SPR and the pattern PTN start to rotate, i.e., at a time $t_{12}$, the switch SWCH changes to the "off" state. Then, at a time $t_{13}$, the diaphragm returns to the full-open aperture position. At a time $t_{14}$, the mirror-down operation (return to the initial position) is completed. Hence, this signal is received by a switch (not shown) so that from the time $t_{14}$, the focus detection is started. At a time $t_{15}$, the detection is completed and a lens driving starts.

Meanwhile, during the AF operation that follows the time $t_{14}$, the timer interrupt function for detecting the AF completion state and the charging and transporting state works. For example, in every 5 msec., the aforesaid states are monitored. Then, at a time $t_{16}$, the switch SWCH turns on, indicating the completion of the charging and transporting operation. By that timer interrupt function, the turning-on of that switch SWCH is detected. Since the completion of the charging and transporting operation is confirmed, the current supply to the motor MTR1 is stopped. Incidentally, because the aforesaid timer interrupt works intermittently, while the switch SWCH and others have changed their positions, this change can not always soon be detected. But, by sufficiently shortening the interrupt interval, this lag can become almost ignored.

Now, in FIG. 2(a), at the time of completion of the above-described charging and transporting operation, the lens is still being driven. Incidentally, because the motor LMTR for lens driving is required to have a high stop accuracy, the speed control is made through a constant voltage circuit. Hence, it is driven always at a constant speed irrelevant to the degree of consumption of the electric power source or battery. But, depending on the type of the lens, the used motor LMTR and the weight of the lens group for focusing which becomes the load, etc. all differ. Therefore, the responsiveness (the driving time space to the drive amount) differs with different types of the lens. The motor MTR1 for the charging and transporting operation, on the other hand, does not necessarily have the high accuracy, but because the large load must be driven at the high speed, the driving speed, i.e., the drive time space varies with the degree of consumption of the electrical power source or battery. As shown in FIG. 2(a), the situation where the charging and transporting operation is completed earlier than the AF operation is encountered:

(i) when the electrical power source or battery of the camera is as good as the new one so that the motor MTR1 can rotate at the high speed;

(ii) when the responsiveness of the lens in use is poor; or (iii) when the required amount of movement of the lens is great or the driving time is long. Since, on this timing chart, after the AF operation has been completed at the time $t_5$, it takes a considerably long time to reach the time $t_{16}$, if the lens driving is short cut at the time $t_{16}$ and transition to the next release operation occurs, there is a high possibility of the image being taken out of focus. Therefore, if the first cycle of AF operation after the release actuation is not yet completed, it is better to let the AF operation go on till the complete end. So, in the invention, the lens is made completely driven. Thus, it is at a time $t_{17}$ when the driving has been completed that the next release operation. i.e., the next cycle of current supply to the magnets MG1 and MG2, is started.

In connection with the arrangement that it is always only when the driving of the lens has been completed that the transition to the next release occurs, it should be noted that if the lens of extremely slow responsiveness is in use, or when it happens that the defocus amount is very large, the frame speed drops largely. On this account, an even better method is to use a lens driving limit timer of proper length so that in an event that even after that time has expired, the driving of the lens does not become completed, the lens is forcibly stopped. This will more fully be described later.

Now, summarizing the foregoing here, a sequence is formed such that by both of the completion of the AF operation and the completion of the charging and transporting operation, the next release is permitted. But this alone does not differ from the conventional AF prior mode. So, in FIG. 2(b), there is shown another sequence which takes place when the timing of each operation has changed from that of FIG. 2(a).

In FIG. 2(b), there is shown a case where as the electric power source or battery is consumed, the charging and transporting time has got longer, while the responsiveness of the lens is good, or the moving speed of the object is low so that the defocus quantity in one cycle of AF operation is small. Because at this time the period of the AF operation is shorter than the charging and transporting period, the AF operation can be performed more than once during the charging and transporting operation.

To begin with, the switch SW1 turns on at the time $t_0$, then the switch SW2 turns on at the time $t_4$, then a series of release operations end, then the focus detection starts at the time $t_{14}$, and then the lens starts to move at the time $t_{15}$. Up to this point, all is similar to that shown in FIG. 2(a). Next, after a relatively short time, the driving of the lens ends at a time $t_{21}$. But the charging and transporting operation is not yet completed. So, subsequently the AF operation is recycled until the charging and transporting operation is completed. And, at a time $t_{25}$, the switch SWCH turns on, indicating that the charging and transporting operation has terminated. Upon detection of this, the lens is immediately stopped from further driving, and transition to the next release operation (the preliminary current supply to the magnets MG1 and MG2) occurs.

In short, this flow shows that the condition for transition to the next release is the AND of the completion of the charging and transporting operation and the completion of one cycle of AF operation. Another feature is that if two or more cycles of AF operation are possible to occur during that charging, these cycles of AF operation is permitted.

In the aforesaid flow, the reason why the AF operation is always once completed is because it takes a considerably long time from the preceding cycle of AF operation (the period of $t_0$ to $t_5$) to the present cycle of AF operation (the period of $t_{14}$ to $t_{21}$) with the release operation (the period of $t_5$ to $t_{14}$) intervening therebetween, so that there is a possibility of occurrence of a considerably large shift of the in-focus position. Therefore, there is need to have the AF operation at least once completed.

Meanwhile, the reason why, despite making permissible the second and later cycles of AF operation, the completion of the charging and transporting operation leads to interrupt of the AF operation is that as has been described above, that amount of shift of the sharp focus which has occurred in the preceding cycle of release operation is eliminated by the first cycle of AF operation after the release actuation, and that since the second and later cycles of AF operation are continuously repeated, because the defocus quantity in each cycle is small, the amount of shift of the sharp focus is small even if the AF operation breaks off on the way. Further, that the AF operation is possible to repeat two or more times suggests that the electric power source or battery is exhausted to elongate the charging and transporting period. In this case, therefore, if the next release is waited until an even more cycle, or the second or later cycle, of AF operation is completed, the frame speed will further drop. Because of this, the second or later cycle of AF operation is brought into an end just at a time when the charging has been completed.

In connection with the AF priority mode of the conventional example, it should be pointed out here that an additional feature of the conventional mode is that though a continuous recycling of the AF operation is possible during the charging and transporting operation, once the result of the AF operation is judged to be in focus, the AF operation is locked and waits for the completion of the charging and transporting operation before the transition to the next release occurs. Therefore, even if the image is out of focus before the start of the next release, this cannot be eliminated. In the invention, on the other hand, the AF operation is recycled as many times as possible during the charging and transporting operation. Another feature is that if that cycle of AF operation which coincides with the completion of the charging and transporting operation is the first one, this cycle is made to continue until it completes itself. Thus, the AF operation and the frame speed can be made to stand together in good balance.

The operation of the camera of the character described above is described by reference to the flowchart of FIG. 3.

When an electric power source switch (not shown) turns on, electric current supply to the control circuit PRS is started, and the control circuit PRS starts to execute the sequence program stored in the ROM.

Figure 3:
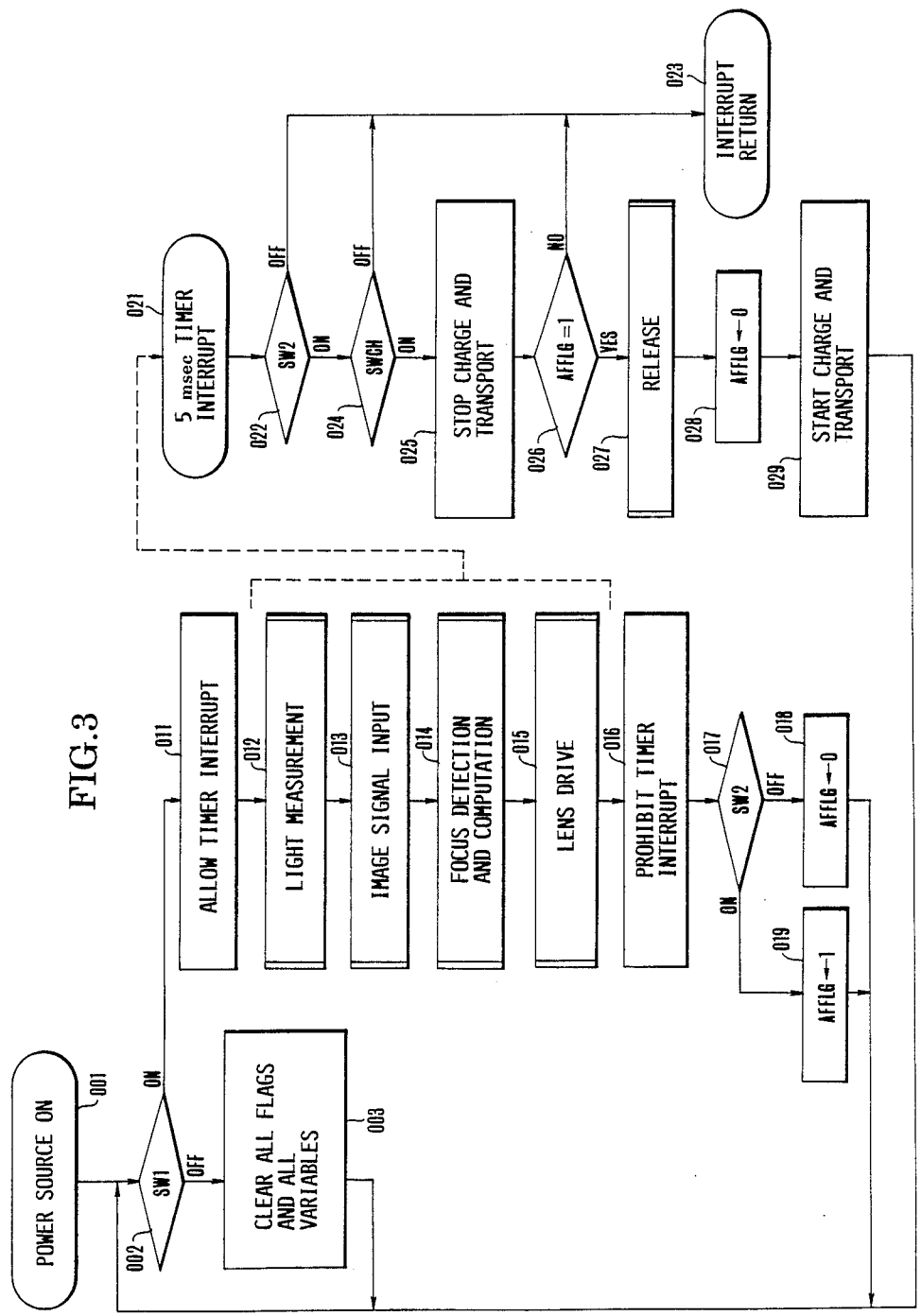
FIG. 3 is a flowchart illustrating the operations of the camera shown in FIG. 1.

FIG. 3 is a flowchart illustrating the entire stream of the aforesaid program. Upon the aforesaid actuation, the execution of the program begins with a step 001. In the next step 002, the state of the switch SW1 which turns on when the release button is pushed to the first stage is detected. If the switch SW1 is off, then the program advances to a step 003 where the flags for control and the variables set in the RAM within the control circuit PRS are all cleared, thus being initialized. These steps 002 and 003 are executed repeatedly until the aforesaid switch SW1 turns on, or until the electric power switch turns off. When the switch SW1 turns on, the program branches from the step 002 to a step 011. In the step 011, an interrupting operation for the timer interrupt to be described later is allowed. This enables the timer interrupting operation to be carried out periodically in the step 012 and those that follow in order to detect various states.

In the step 012, a "light measurement" subroutine for exposure control is executed. The control circuit PRS receives the output SSPC of the light measuring sensor SPC shown in FIG. 1 at its input terminal, then performs the A/D conversion, then, from its digital light measurement value, computes an optimum shutter control value, aperture control value, and then stores them in respective predetermined addresses of the RAM. And, at the time of the release operation, the control of the shutter and the diaphragm is made on the basis of these values.

Subsequently, an "image signal input" subroutine is performed in a step 013, and the control circuit PRS receives the input of the image signal from the sensor device SNS.

In the next step 014, the defocus quantity of the photographic lens is computed on the basis of the inputted image signal. A detailed explanation of the concrete operation and computation formulae of the steps 013 and 014 is omitted.

A step 015 is a subroutine that performs the lens driving on the basis of the aforesaid detected defocus quantity. Details about this will be described later.

In a step 016, the timer interrupt which has been allowed in the step 011 is prohibited so that no interrupt occurs in the following steps 017 to 019. The state of the switch SW2 which turns on when the release button is pushed to the second stage is checked. If off, the program advances to a step 018. If on, the program branches to a step 019. AFFLG of the steps 018 and 019 is a flag defining whether the AF operation of the aforesaid steps 012 to 015 has been completed under the condition that the switch SW1 alone is on, or under the condition that the switch SW2 too is on. Therefore, if the AF operation has been completed when the switch SW2 is off, in other words, when only the switch SW1 is on, "0" is stored in the flag AFFLG. If the AF operation has been completed under the condition that the switch SW2 is on, "1" is stored in the flag AFFLG. Here, the switch SW2 is first assumed to be off. So, the flag AFFLG is "0".

The foregoing steps 002 and 011 to 018 constitute the AF operation under the condition that the switch SW1 alone is on. Next explanation is given to the timer interrupting operation which is introduced into the steps 012 to 015 of that flow.

The timer interrupt of a step 021 is an interrupt function that by periodically monitoring the switch SW2, the charging and transporting state and the history of the AF operation, whether or not the program should proceed to the release operation is determined. During the execution of the steps 012 to 015, the interruption occurs in, for example, every 5 msec.

Each of these steps is explained below.

Past the step 021, in a step 022, the state of the switch SW2 is discriminated. If off, the program returns to a step 023 for interrupt return. That is, so long as only the switch SW1 is on to repeat the AF operation, even though that interruption occurs in every 5 msec., the program immediately returns because the switch SW2 is off.

If the switch SW2 is determined in the step 022 to be on, the program then advances to a step 024 where the discrimination of the switch SWCH is carried out. If that switch SWCH is off, as it implies that a charging and transporting operation which has occurred after the release has already been actuated is still in progress, the shutter cannot be released yet. Therefore, the program returns at the step 023, permitting the AF operation to continue and also the charging operation to continue.

If, in the step 024, the switch SWCH is on, as it implies that the charging and transporting operation has been completed, a stop signal for the charging and transporting operation is produced to stop the motor MTR1 in a step 025. The program then advances to step 026.

In the step 026, the flag AFFLG is tested. If AFFLG=1, as it implies that after the switch SW2 has turned on, the AF operation has been at least once completed, the program then advances to a step 027. If AFFLG≠1, i.e., "0", because, from the time when the switch SW2 has turned on, the AF operation is not yet once completed, the program then returns at the step 023. Hence, no release operation takes place.

Subsequently, the flag AFFLG is reset to "0" in a step 028. Then, a charging and transporting operation starts in a step 029. (This is performed by rotating the motor MTR1). Then, the program returns to the step 002, while the charging and transporting operation is simultaneously being carried out. From the step 011, the next focus detecting operation is started.

Figure 4:
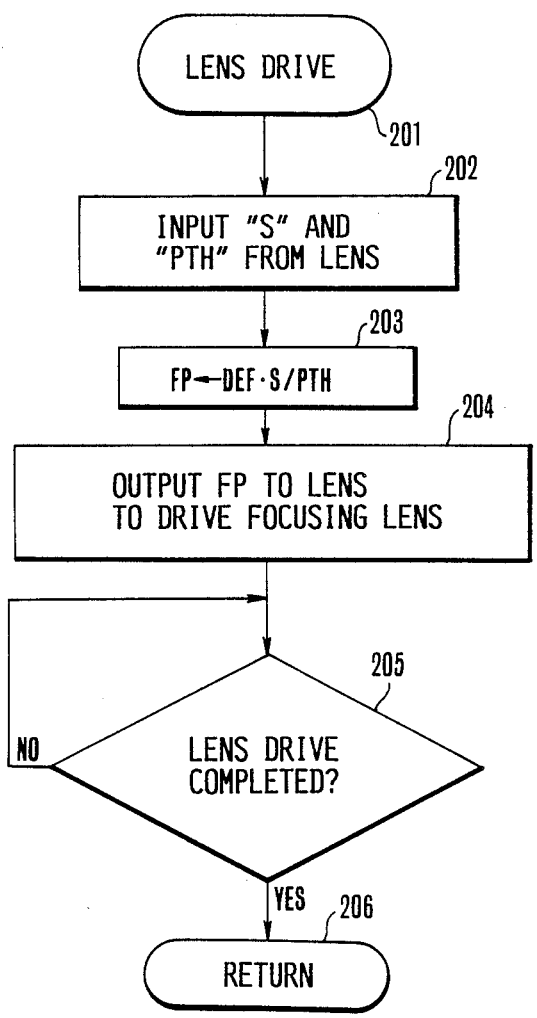
FIG. 4 is a flowchart illustrating a subroutine for "lens drive" shown in FIG. 3.

In FIG. 4, there is shown a flowchart for the "lens drive" subroutine.

As this subroutine is executed, in a step 202 of FIG. 4, communication with the lens is performed and two data "S" and "PTH" are inputted. The "S" represents the "coefficient of the forward movement of the focusing lens versus the defocus quantity". For example, in the case of the single lens of the bodily moving type, because the whole photographic lens is the focusing lens, "S=1". In the case of the zoom lens, the value of the "S" varies depending on each zoom position. The "PTH" represents the amount of forward movement of the focusing lens per one output pulse produced by the encoder ENCF operatively connected to the axial movement of the focusing lens LNS.

Therefore, for the given defocus quantity DEF, the required amount of forward movement of the focusing lens to sharp focus adjustment, reduced to the number of output pulses of the encoder ENCF, i.e., the so-called lens drive amount FP, is expressed in terms of the S and PTH by the following formula:

FP=DEF×S/PTH

This equation is computed without any alteration in a step 203.

In a step 204, the FP obtained in the step 203 is sent to the lens FLNS, commanding a driving of the focusing lens (in the case of the bodily movable single lens, the whole photographic lens).

In the next step 205, by communicating with the lens FLNS, whether or not the driving of the lens drive amount FP it has commanded in the step 204 has ended is detected. When the driving ends, the program advances to a step 206 and returns the "lens drive" subroutine.

Figure 5:
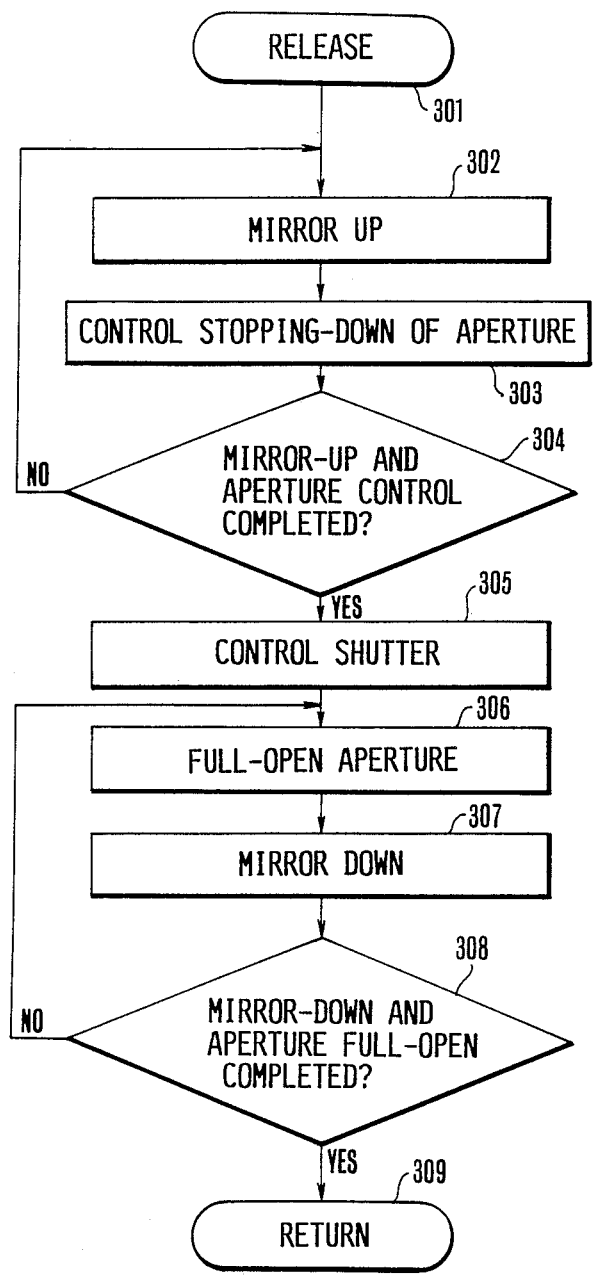
FIG. 5 is a flowchart illustrating a subroutine for "release" shown in FIG. 3.

In FIG. 5, there is shown a flow of the "release" subroutine.

In a step 302, the quick return mirror of the camera is moved upward. This is carried out by controlling the motor MTR2 through the drive circuit MDR2 by using the signals M2F and M2R for motor control.

In the next step 303, the aperture control value already stored by the "light measurement" subroutine of the previous step 012 is sent out to the lens FLNS, causing this lens FLNS to perform the aperture control.

In a step 304, whether or not the mirror-up and the aperture control in the preceding steps 302 and 303 has already ended is detected. The mirror-up can be confirmed by a detection switch (not shown) associated with the mirror. The aperture control is confirmed by communication of sensing whether or not the driving of the lens FLNS has been performed to the predetermined aperture value.

In a case where any of them is not yet completed, the program waits in this step 304. Subsequently, the state detection is performed. When both controls are confirmed, the program advances to a step 305. At this point in time, the preparation for the exposure is completed.

In a step 305, the shutter control is performed by the shutter control value already stored by the "light measurement" subroutine of the previous step 012 to expose the film.

When the shutter control ends, the next step 306 sends a command for moving the diaphragm to the full open aperture to the lens FLNS. Subsequently, in a step 307, the mirror-down is performed. The mirror-down is carried out likewise the mirror-up by controlling the motor MTR2 by using the signals M2F and M2R for motor control.

In the next step 308, similarly to the step 304, the completion of the mirror-down and the aperture full-open control is waited for. When the mirror-down and the aperture full-open control both have been completed, the program advances to a step 309 and returns.

The foregoing flow is reviewed with reference to FIG. 3.

At first, when the switch SW1 only is on, the steps 002, 011 to 017 and 018 are executed repeatedly. Then, during the execution of the steps 012 to -, the interruption of the step 021 is performed in every 5 msec., but in the step 022, the switch SW2 is determined to be off. So, the return soon occurs.

When the switch SW2 is turned on during the aforesaid cycle, this is detected in the step 022 by the timer interrupt. The program then goes to the step 024. Because this flow is on assumption of the first cycle of the release, the charging and transporting operation holds the completed state as a matter of course. In the step 024, therefore, the switch SWCH is determined to be on. The program then goes to a step 025. Here, the execution of the step 025 is meaningless. The program goes to a step 026. At the point in time when the step 026 is first reached, the flag AFFLG is "0". So, the program is returned at the step 023. Then, the AF operation and the timer interruption alternately continue. When the AF operation is completed, the program advances from the step 017 to the step 019, where "1" is stored in the flag AFFLG. The program then returns to the step 002. Then, on the first timer interruption just after the program has advanced from the step 011 to the step 012, the program, by now, reaches the steps 022 to 026. In the step 026, AFFLG=1 is judged. The program then is allowed to advance to the step 027 for the release.

After the end of the release operation, the flag AFFLG is reset to "0". The program then returns to the step 002, while simultaneously starting the charging and transporting operation in the step 029, and advances from the step 011 to the step 012, starting the next AF operation.

Because in the timer interruption a short time later after the "on" state of the switch SW2 has been continued, the switch SWCH is off and the flag AFFLG is "0", the AF operation is repeated. Then, if the switch SWCH has turned on earlier, the charging and transporting operation is stopped, and the change of the flag AFFLG to "1", i.e., the completion of the first cycle of AF operation, is waited for. After the flag AFFLG has become "1", the release operation then is performed.

If the flag AFFLG becomes "1" earlier, on the other hand, the turning-on of the switch SWCH is waited for, while the AF operation is recycled. When this switch SWCH has turned on, the motor MTR1 is stopped and the release operation is started.

In the above-described first embodiment, for an event that the release start signal due to the turning-on of the switch SW2 comes at a time during the recycling of the AF operation, that cycle of AF operation which is operating in the timing of closure of the switch SW2 is brought into completion, and then the release operation is performed. Therefore, the release chance for the first frame might be lost with a high possibility. So, in another embodiment to be described below, it is made possible that as soon as the switch SW2 turns on, the shutter is released. Another feature is that the lens driving period is limited by using a timer so that if the lens driving period has become extremely long during the continuous shooting, the driving of the lens is broken off by the aforesaid limit timer, thereby giving an advantage that the frame speed is prevented from very decreasing. This embodiment is described by reference to FIG. 6 and those that follow.

Figure 6:
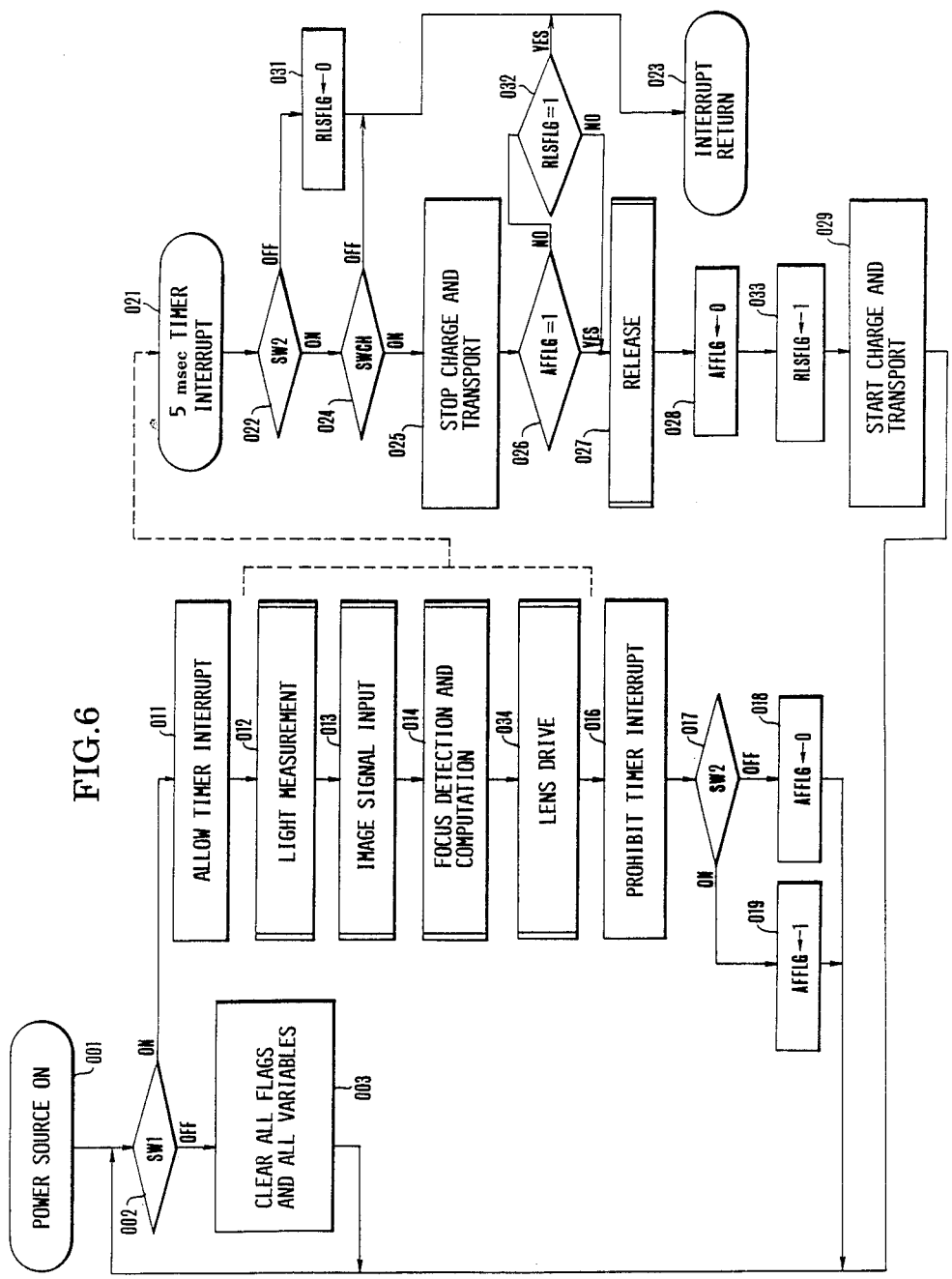
FIG. 6 is a flowchart illustrating the operations in another embodiment of the invention.

In FIG. 6, there is shown a flowchart of the second embodiment. Since the main part is the same as that of the first embodiment shown in FIG. 3, the like steps are denoted by the same reference numerals and only different ones are explained.

In the interrupt timer flow within that flow, a flag labeled RLSFLG is defined, and steps 031, 032 and 033 concerning it are added.

The step 031 is inserted after the "off" branch of the step 022, the step 032 after the "no" branch of the step 026, and the step 033 after the step 028. The flag RLSFLG represents whether or not, after the switch SW2 has been turned on, the release operation (the operation of from the mirror-up to the exposure) has been performed. When "0", the release is not yet performed. When "1", the release operation has already been performed.

The operation is as follows:

At first, so long as the switch SW1 only is on to repeat the AF operation, even if the timer interrupt starts to operate, the program soon returns because the step 022 detects that the switch SW2 is off. This procedure is the same as that described in connection with the first embodiment. Yet, in the FIG. 6 embodiment, the step 022 is made followed by the step 031 where the flag RLSFLG is reset to "0". It is after this that the program returns at the step 023. In other words, when the switch SW1 only is on, RLSFLG=0 always results.

Then, when the switch SW2 turns on, the timer interrupt operates so that the program advances to the step 021. After that, past each step, the step 026 is reached. Because at this time AFFLG=0, the program advances to the step 032. Because at this time, RLSFLG=0, branch to "NO" occurs at the step 032. Immediately it proceeds to the release operation. In other words, for the first frame after the switch SW2 has turned on, the release starts immediately after the switch SW2 has turned on. And, after the steps 027 and 028 has been executed, the flag RLSFLG is set to "1" in the step 033. Having executed the step 029, the program returns to the step 002.

For the second frame of the continuous shooting, if a very long time has not passed from the preceding release operation, branch to "NO" occurs the step 026 because the AF operation for the first frame is unfinished. Because at this time the flag RLSFLG is "1", branch to "YES" occurs at the step 032. Therefore, without being released, the program returns at the step 023. That is, to expose the second or later frame of the continuous shooting, the AF operation must always be once completed to set the flag AFFLG to "1". This is the same as in the first embodiment.

Summarizing the foregoing, when the switch SW1 alone is on, the AF operation is repeated, and when the switch SW2 turns on, the release operation immediately succeeds to shoot the first frame. If, after that, the switch SW2 remains on, the termination of the release operation for the preceding frame is always followed by the completion of at least one cycle of AF operation, before the next release becomes possible to perform.

Next, another method of the "lens drive" subroutine is explained.

This subroutine is represented by a step 034 in FIG. 6, corresponding to the step 015 of FIG. 3. That subroutine is explained by reference to FIG. 7.

Figure 7:
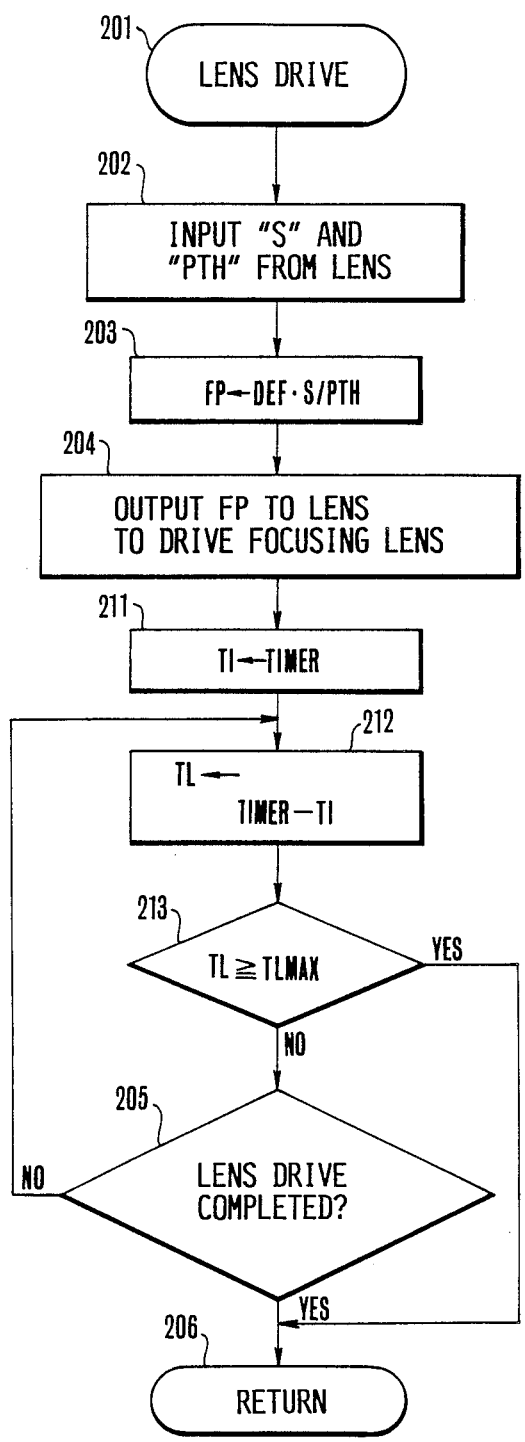
FIG. 7 is a flowchart illustrating a subroutine for "lens drive" shown in FIG. 6.

The flow of FIG. 7 is similar in the main part to that shown in FIG. 4, and steps 211, 212 and 213 are only added. Therefore, an explanation of the other steps than these is omitted.

After the lens drive command is given off in the step 204, the timer value TIMER of the self-running timer the control circuit PRS itself has is stored in a memory area TI on the RAM. Thus, the time of the start of a lens driving is memorized.

Then, the difference between he present time TIMER and the TI, i.e., the passed time from the start of the lens driving, is stored in a memory area TL in the step 212. Then, the TL is compared with a constant TLMAX in the step 213. If the TL becomes larger than the TLMAX, the program returns at the step 206. If TL<TLMAX, whether or not the lens driving is completed is tested in the step 205. If not completed, the program returns to the step 212. If completed, the program returns at the step 206.

That is, this subroutine always monitors the passed time for which the lens has been driven. In an event that the driving is completed within the certain predetermined value TLMAX, the indicated amount by the FP of driving is carried out. If the time is to become longer than the TLMAX, the driving is broken off when the time TLMAX has expired. In such a manner, if it takes a longer time than the certain value to complete the driving of the lens, the driving is brought to an end on the way. Such a situation is encountered when the object to be photographed has moved at a high speed with the result that the defocus quantity is large. Therefore, the required amount of movement of the lens gets so long that a perfect focus adjustment is impossible to perform in any way whatever. Therefore, the influence owing to the stoppage of the driving in the middle of the course is relatively little.

It should be noted that this lens drive subroutine may be employed in the first embodiment, as a matter of course.

Also, though, in the above-described first and second embodiments, if the charging is completed in the second or later cycle of AF operation during the continuous shooting, the AF operation is prohibited to permit transition to the release operation. This arrangement may be modified so that the AF operation can be performed in parallelism with the release operation. Then, there is no need to prohibit the AF operation.

Since, in the circuit form of the present embodiment, for example, the lens has a separate drive circuit LPRS, the lens can be driven even during the release operation. In more detail, suppose the charging has been completed at a time during the AF operation in the second or later cycle and moreover during the lens driving, then the control of the release operation is carried out by the control circuit PRS of the camera side and at the same time the driving of the lens can be controlled by the control circuit LPRS. If a control is made so that the driving of the lens is prohibited just before the shutter curtain runs, the lens driving can be carried out for a longer time without having to lower the frame speed.

Further, since, in the circuit of the present embodiment, the control circuit PRS of the camera side governs both of the release operation control and the AF operation control, a parallel control of both is impossible. But, if an independent processing circuit for the AF operation control is provided, it becomes possible that when the charging has been completed at a time during the second or later cycle of AF operation during the continuous shooting and moreover during the focus detection and computation, the release operation and the AF operation can be carried out in parallelism.

With the use of such a feature, there is no need to prohibit the AF operation at the time of the start of the release operation. Instead, it becomes possible to continue the AF operation just until the time of the start of an exposure, i.e., the start of the running of the shutter curtain. Thus, while maintaining the frame speed at the same value as that in the first and second embodiments, the focusing can be better carried out.

According to the present embodiment, as the AF operation and the release are alternately repeated in continuous relation, if, despite the completion of the charging of the camera which is carried out after the termination of the release operation, the AF operation has not been once completed yet, either the initiation of the release is deferred depending on the completion of the AF operation, or the release, even though the AF operation is on the way, is immediately initiated by breaking off the AF operation with consideration of the shutter chance. If, despite the completion of the AF operation, the camera is not fully charged, the AF operation is repeated until the charging is completed. At the time of completion of the charging, the AF operation is prohibited. These operations may otherwise be parallel-processed to bring both to completion, at which the release is made initiated. Therefore, shootings with the image sharpness and the frame speed both appropriately balanced can be performed.

What is claimed is:

1. A camera having a continuous shooting function in which at the end of each shooting operation, a preparing operation for a next shooting operation is performed, and in response to completion of the preparing operation for the next shooting operation, the next shooting operation is started, comprising:
    (a) autofocus device means for repeating an autofocus operation cycle at an end of the shooting operation;
    (b) judgment circuit means for determining whether the autofocus operation cycle has been performed a predetermined number of times as of completion of preparation for the next shooting operation, and
    (c) control circuit means for starting the next shooting operation when it is determined by said judgment circuit means that the autofocus operation has been performed the predetermined number of times as of the completion of the next shooting operation, and, when it is determined by said judgment circuit means that the autofocus operation has not been performed the predetermined number of times as of the completion of the next shooting operation, for delaying the start of the next shooting operation until completion of the autofocus operation then being performed.

2. A camera according to claim 1, wherein said predetermined number of times is once.

3. A camera having a continuous shooting function in which at the end of each shooting operation, a preparing operation for the next shooting operation is performed, and in response to completion of the preparing operation for the next shooting operation, the next shooting operation is started, comprising:
    (a) autofocus device means for repeating an autofocus operation cycle at an end of the shooting operation;
    (b) judgment circuit means for determining whether the autofocus device means has performed at least one cycle as of completion of the preparation of the next shooting operation, and if at least one cycle is performed, outputs a first signal, and if at least one cycle is not performed, outputs a second signal; and
    (c) control circuit means for starting the next shooting operation in response to said first signal and, when said second signal is output starts the next shooting operation in response to completion of the autofocus operation cycle.

4. A camera according to claim 3, wherein said autofocus operation includes a focus detecting operation performed by a focus detecting circuit and a lens driving operation based on a result of said focus detecting operation and performed by a lens drive circuit, wherein said focus detecting operation and said lens driving operation constitute one cycle of autofocus operation, and wherein one cycle of autofocus operation is completed by the completion of said lens driving operation in said one cycle.

5. A camera according to claim 4, further comprising a film transport circuit for, after the end of each shooting operation, transporting film by one frame and wherein the preparing operation of the next shooting operation is completed by the completion of a film transporting operation by one frame performed by said film transport circuit.

6. A camera according to claim 5, further comprising a detecting circuit for detecting the film transporting operation performed by said film transport circuit and for producing, when detecting the completion of the film transporting operation by one frame, a film transport completion signal indicative of the completion of the preparing operation for the next shooting operation.

7. A camera having a continuous shooting function in which at the end of each shooting operation, a preparing operation for a next shooting operation is performed, and in response to completion of the preparing operation for the next shooting operation, the next shooting operation is started, comprising:
    (a) autofocus device means for repeating an autofocus operation cycle at an end of the shooting operation;
    (b) judgment circuit means for determining whether the autofocus device means has performed a predetermined number of cycles as of completion of the preparation of the next shooting operation, and if a predetermined number of cycles are performed, outputs a first signal, and if a predetermined number of cycles are not performed, outputs a second signal;
    (c) control circuit means for starting the next shooting operation in response to said first signal and, for delaying the next shooting operation until completion of the autofocus operation cycle in response to said second signal; and
    (d) autofocus operation stopping circuit means for stopping the autofocus operation in response to said first signal and, when said second signal is output, for stopping the autofocus operation in response to completion of said autofocus operation cycle.

* * * * *

UNITED STATES PATENT AND TRADEMARK OFFICE
CERTIFICATE OF CORRECTION

PATENT NO. : 4,974,003
DATED : November 27, 1990
INVENTOR(S) : Ichiro OHNUKI, ET AL.

It is certified that error appears in the above-identified patent and that said Letters Patent is hereby corrected as shown below:

COLUMN 2:
    Line 40, "sequence" should read --sequence.--; and
    Line 43, "CLCM." should read --CLCM,--.

COLUMN 3:
    Line 39, "shown)" should read --shown).--; and
    Line 58, "rotates" should read --rotates.--.

COLUMN 6:
    Line 9, "runs." should read --run.--;
    Line 25, "starts" should read --start--.
    Line 58, "can become" should read --can be--; and COLUMN 8:
    Line 15, "is" should read --are--.

COLUMN 11:
    Line 58, "to -," should read --to 015,--.

UNITED STATES PATENT AND TRADEMARK OFFICE
CERTIFICATE OF CORRECTION

PATENT NO. : 4,974,003

DATED : November 27, 1990

INVENTOR(S) : Ichiro OHNUKI, ET AL

It is certified that error appears in the above-identified patent and that said Letters Patent is hereby corrected as shown below:

COLUMN 13:

Line 58, "has" should read --has,--; and
    Line 61, "he" should read --the--.

COLUMN 15:

Line 26, "operation," should read --operation;--.

Signed and Sealed this

Twenty-second Day of September, 1992

*Attest:*

DOUGLAS B. COMER

*Attesting Officer*     *Acting Commissioner of Patents and Trademarks*